United States Patent
Watanabe (10) Patent No.: US 10,153,076 B2
(45) Date of Patent: Dec. 11, 2018

(54) COIL COMPONENT AND METHOD FOR PRODUCING THE SAME

(71) Applicant: SUMIDA CORPORATION, Tokyo (JP)

(72) Inventor: Ryuji Watanabe, Sendai (JP)

(73) Assignee: SUMIDA CORPORATION, Tokyo (JP)

( * ) Notice: Subject to any disclaimer, the term of this patent is extended or adjusted under 35 U.S.C. 154(b) by 0 days.

(21) Appl. No.: 15/462,303

(22) Filed: Mar. 17, 2017

(65) Prior Publication Data

US 2017/0309383 A1  Oct. 26, 2017

(30) Foreign Application Priority Data

Apr. 20, 2016  (JP) ................... 2016-084835

(51) Int. Cl.
  *H01F 5/04*  (2006.01)
  *F16K 31/06*  (2006.01)
  *H01F 5/06*  (2006.01)
  *H01R 4/02*  (2006.01)

(52) U.S. Cl.
  CPC ........... *H01F 5/04* (2013.01); *F16K 31/0675* (2013.01); *H01F 5/06* (2013.01); *H01R 4/023* (2013.01)

(58) Field of Classification Search
  CPC ... H01F 5/04; H01F 5/06; H01R 4/023; F16K 31/0675
  USPC ....................................... 335/282
  See application file for complete search history.

(56) References Cited

U.S. PATENT DOCUMENTS

| | | | | |
|---|---|---|---|---|
| 5,197,507 A * | 3/1993 | Miki | ................... | G05D 16/2013 137/1 |
| 5,261,371 A * | 11/1993 | Sumida | ..................... | F02M 3/07 123/339.27 |
| 5,647,311 A * | 7/1997 | Liang | ........................ | F01L 9/04 123/90.11 |
| 6,053,472 A * | 4/2000 | DeLand | ............. | F02M 25/0836 251/129.11 |
| 6,247,447 B1 * | 6/2001 | Muraji | ..................... | F02D 11/10 123/339.14 |
| 6,460,521 B1 * | 10/2002 | Modien | ............... | F16K 31/0655 123/568.21 |

(Continued)

FOREIGN PATENT DOCUMENTS

JP  2014-229805 A  12/2014

*Primary Examiner* — Shawki S Ismail
*Assistant Examiner* — Lisa N Homza
(74) *Attorney, Agent, or Firm* — Oliff PLC (57) ABSTRACT

A coil component 1 such as a solenoid valve is provided with a wiring part 20 formed by winding a conducting wire 4 therearound, and terminal electrodes 3A, 3B having connection terminals 16A, 16B electrically connected to the conducting wire 4. A locking piece 15A is provided on the terminal electrode 3A on a side of a wiring part for the connection terminal 16A, a starting end part of the conducting wire 4 is locked to the locking piece 15A, and the conducting wire 4 is led up in a direction reverse to a direction in which the wiring part 20 is arranged at a predetermined position, is passed into the connection terminal 16A so as to be electrically connected to the connection terminal 16A, and further led up in the direction reverse to the direction in which the wiring part 20 is arranged at a predetermined position.

14 Claims, 9 Drawing Sheets

(56) References Cited

U.S. PATENT DOCUMENTS

| | | | | |
|---|---|---|---|---|
| 6,508,272 B1* | 1/2003 | Parsons | E03C 1/057 | 137/595 |
| 6,628,187 B2* | 9/2003 | Hashimoto | H02K 3/525 | 336/192 |
| 6,672,326 B2* | 1/2004 | Pappalardo | F23N 1/005 | 137/614.11 |
| 6,719,224 B2* | 4/2004 | Enomoto | B60H 1/3205 | 239/533.9 |
| 6,943,657 B2* | 9/2005 | Subramanian | F16K 31/0637 | 251/129.15 |
| 7,038,563 B2* | 5/2006 | Andoh | H01H 50/443 | 335/126 |
| 7,165,574 B2* | 1/2007 | Ryuen | F16K 31/0665 | 137/596.17 |
| 7,570,138 B2* | 8/2009 | Hirabayashi | F02N 11/00 | 307/10.6 |
| 8,134,436 B2* | 3/2012 | Yasoshima | H01F 7/127 | 251/129.15 |
| 8,344,833 B1* | 1/2013 | Baldauf | H01H 50/443 | 335/202 |
| 8,973,895 B2* | 3/2015 | Thomas | F01N 3/2066 | 137/625.48 |
| 2002/0017623 A1* | 2/2002 | Noyes | F16K 1/14 | 251/61 |
| 2002/0104979 A1* | 8/2002 | Kato | F02M 25/0836 | 251/129.17 |
| 2002/0117642 A1* | 8/2002 | Iwata | F04B 27/1804 | 251/61.4 |
| 2003/0197143 A1* | 10/2003 | Kai | F02M 25/0836 | 251/129.17 |
| 2005/0029480 A1* | 2/2005 | Cook | F02M 25/0836 | 251/129.19 |
| 2006/0278838 A1* | 12/2006 | Chavanne | F16K 31/0631 | 251/129.15 |
| 2007/0069165 A1* | 3/2007 | Hess | F16K 31/0655 | 251/50 |
| 2008/0035868 A1* | 2/2008 | Okuda | F02M 25/0836 | 251/118 |
| 2009/0014671 A1* | 1/2009 | Allidieres | F16K 1/34 | 251/65 |
| 2009/0200502 A1* | 8/2009 | Hoppe | F01L 1/34 | 251/129.15 |
| 2009/0224192 A1* | 9/2009 | Oikawa | F16K 11/0716 | 251/129.15 |
| 2011/0089350 A1* | 4/2011 | Beneker | F01L 1/34 | 251/129.15 |
| 2013/0276914 A1* | 10/2013 | Kritzman | F16K 31/004 | 137/485 |
| 2017/0320515 A1* | 11/2017 | Levesque | B62D 5/0433 | |

* cited by examiner

COIL COMPONENT AND METHOD FOR PRODUCING THE SAME

RELATED APPLICATION

This application claims the priority of Japanese Patent Application No. 2016-084835 filed on Apr. 20, 2016, which is incorporated herein by reference.

BACKGROUND OF THE INVENTION

Field of the Invention

The present invention relates to a coil component which is used in a solenoid valve, an electromagnetic actuator or the like, and is mold-sealed on a whole surface, and a method for producing the coil component.

Description of the Prior Art

Coil components, for example, to be installed in an engine compartment of an automobile or directly exposed to an external environment in several cases, or the components to be used in an ABS coil, a valve for an air conditioner, or a valve of a washer apparatus are strongly influenced by the external environment such as temperature, humidity, shock, vibration, or dust.

The coil components used under a harsh environment in which the coil components are influenced by various external environments in such a manner are desired to be provided with a function such as waterproofing and dustproofing. Under such a kind of desire, an overmolding technique for covering the coil component by using a mold resin is applied.

However, when the coil component is repeatedly subjected to a thermal load, a conducting wire is to be subjected to significant stress in association with expansion and contraction depending on a difference in a thermal expansion coefficient between the mold resin used in an overmolded member, and the conducting wire. Then, disconnection is liable to be caused in the conducting wire by the stress.

Therefore, the art in Patent Document 1 described below is contemplated for reducing a risk of disconnection by winding a coil onto a bobbin in a state of providing a diverted coil with somewhat tension, and then changing a diverted path to a straight path, and providing a lead-out portion of the coil with moderate allowance (loosening).

Figure 9:
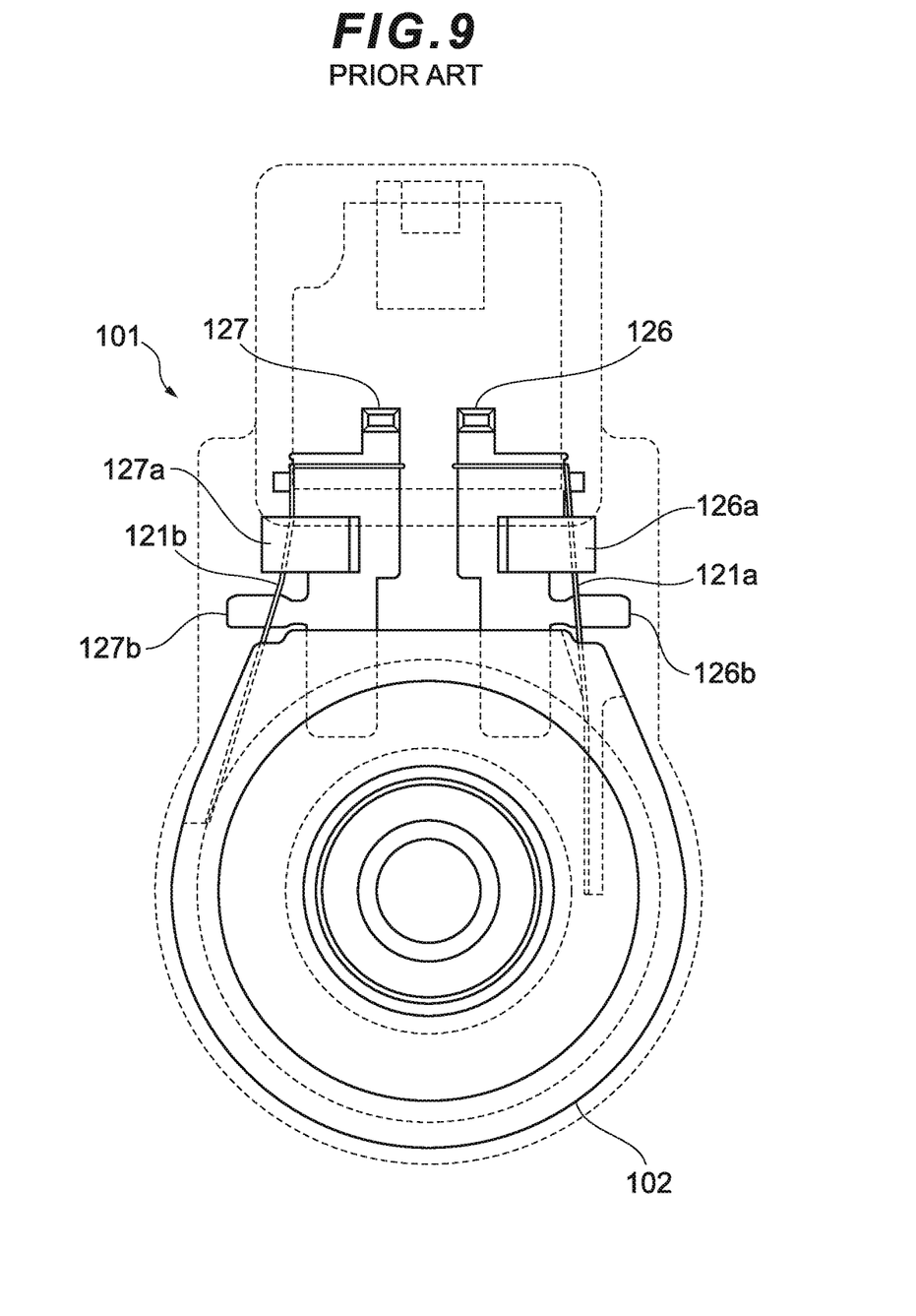
FIG. 9 is a diagram showing a coil component according to a conventional art.

Specifically, as shown in FIG. 9 (FIG. 2 in Patent Document 1), a terminal part 121a of a conducting wire is abutted against a projected part 126b of a terminal 126 in a coil component 101. Thus, a space between both parts is configured to be adjusted in a state in which both are somewhat diverted without directly tightly stretching the wire between a fixing part of the terminal 126 and a fixing part of a bobbin 102. Then, if the projected parts 126b, 127b are bent on from the surface to the back of the paper direction to release abutment between the projected parts 126b, 127b and terminal parts 121a, 121b of a conducting wire 104, tension in the terminal parts 121a, 121b between the bobbin 102 and terminals 126, 127 is released, and the moderate allowance (loosening) is caused, thereby reducing the risk of disconnection.

Related Prior Art

Patent Document 1: Japanese Laid-Open Patent Application No. 2014-229805(A)

SUMMARY OF THE INVENTION

However, a demand for size reduction of coil components has been recently exigent, and restriction on a length of a terminal electrode has also been strict to have no allowance for a space in which the "projected parts 126a, 127b" are provided as in the conventional art described above. Such a request for size reduction of the components is predicted to be more exigent in the future.

Further, part of the terminal parts 121a, 121b between the bobbin 102 and the terminals 126, 127 is eventually formed into a point-to-point construction without extending along a profile surface of the coil component in the conventional art described above. Here, the "point-to-point construction" refers to a state in which a conducting wire is passed through air without anything for supporting the conducting wire between support members for supporting both ends of the conducting wire.

The present invention has been made in view of such circumstances, and is contemplated for providing a coil component capable of excluding a risk of causing a point-to-point construction and preventing occurrence of disconnection in a molding process or the like even when there is no space in which a structure along which a conducting wire extends is provided upon leading the conducting wire from a terminal electrode to a wiring part, and a method for producing the coil component.

In order to solve the problem described above, the coil component and the method for producing the coil component according to the present invention have the features described below.

A coil component according to the present invention has features comprising a terminal electrode having a wire connection part to be connected to a conducting wire, and a wiring part formed by winding the conducting wire from the terminal electrode therearound, wherein a locking part to which an end part of the conducting wire is locked is provided on a side of the wiring part of the wire connection part in the terminal electrode, the conducting wire is configured in a manner of being passed into the wire connection part in such a manner that the conducting wire from the locking part can be electrically connected with the wire connection part, and a structure for supporting the conducting wire passed through the wire connection part is provided on a side reverse to the locking part relative to the wire connection part.

The structure for supporting the conducting wire is a wire support part which is projected from a side of the terminal electrode toward a lateral direction.

Preferably, the terminal electrode has a wide part formed to be wide in a lengthwise direction of the wire support part on a side reverse to the wire connection part with interposing the wire support part therebetween, wherein a notch is formed from a lateral direction of the terminal electrode on a side of the wire support part in the wide part, and the notch and a tip part of the wire support part on the lateral side are combined, and a V-shaped notch part is formed, and the conducting wire is configured in a manner of being fitted into the V-shaped notch part in a state in which the conducting wire is wound around about one half a circumferential surface of the wire support part.

Further, a base part made of resin is provided on a side of the terminal electrode reverse to the wiring part, and a guide part for guiding the conducting wire from the terminal electrode to the wiring part in diverting the terminal electrode is formed in the base part made of resin, in which the guide part comprises at least a side surface guide member and a bottom surface guide member for guiding the conducting wire along a surface in a lateral direction of the coil component, and a longitudinal groove guide member which is formed in a position closer to the wiring part than the side surface guide member and the bottom surface guide member to guide the conducting wire in a longitudinal direction of the coil component.

Preferably, a top surface of the wire support part of the terminal electrode, and a bottom surface of the bottom surface guide member are formed to be flush with each other.

Further, the longitudinal groove guide member is provided with a lead groove into which at least one of the conducting wires on a starting end side and on a terminating end side is fitted and the conducting wire is guided, and a pedestal-shaped part in which the other of the conducting wires on the starting end side and on the terminating end side is guided in a manner of being in parallel with the lead groove in a position higher than the lead groove by one step.

Further, an eaves part for preventing departure of the other conducting wire from the longitudinal groove guide member is provided in a position facing the pedestal-shaped part with interposing the conducting wire therebetween.

Preferably, the wire connection part is arranged in a position deviated from a place on a straight line with which a conducting wire locking portion of the locking part, and a conducting wire wiring portion of the wire support part are connected, and the conducting wire which is run among members of the conducting wire locking portion of the locking part, the conducting wire wiring portion of the wire support part, and the wire connection part is tightly stretched in a meandering manner among the members.

Still further, the coil component comprises, on the base part made of resin, a rib part of the terminal electrode, in which a fitting hole for fitting a leg part of a conductive connection piece formed into an elongated plate shape is arranged, and the rib part is formed into a height allowing formation of a deep fitting hole at a degree of being able to suppress the conductive connection piece from inclining even if deformation of the leg part of the conductive connection piece is caused.

Preferably, the base part made of resin is formed of a plastic resin, integrally with a bobbin around which the conducting wire is wound in the wiring part.

Moreover, preferably, the wire connection part is formed into a J-shaped belt form in cross section according to which the conducting wire can be included therein over a predetermined length.

Preferably, the coil component according to any one described above is coated with an overmolded exterior part with a resin agent.

Further, a method for producing a coil component according to the present invention has features in which, the method for producing the coil component is provided with a terminal electrode having a wire connection part to be connected to a conducting wire, and a wiring part formed by winding the conducting wire from the terminal electrode therearound, wherein a starting end part of the conducting wire is locked to a locking part provided thereon on a side of the wiring part for the wire connection part in the terminal electrode, the conducting wire is then passed through the wire connection part in such a manner that electrical connection is achieved between the conducting wire and the terminal electrode, and the conducting wire is then guided in a direction opposite to the side of the wiring part and diverted to be guided to the wiring part.

Further, in the above case, preferably, the wire connection part is subjected to processing of caulking and resistance welding in a state in which the conducting wire is included therein.

According to the coil component of the present invention, the locking part is provided on a side of a coil part of the connection part in the terminal electrode. An end part (starting end part) of the conducting wire is locked to the locking part. Then, the conducting wire is directed toward a connection part with the conducting wire, positioned on a side reverse to the coil part, without being directed to a direction of the coil part, which is different from the conventional art. Further, the conducting wire from the connection part is supported by a wire support structure positioned on a side reverse to the locking part, and therefore the conducting wire can be then run, while being extended along a suitable portion of a profile of the coil component, to reach the coil part.

Moreover, in the method for producing the coil component according to the present invention, the locking part is configured to be provided on a side of the coil part of the connection part in the terminal electrode. The end part (starting end part) of the conducting wire is locked to the locking part, and then the conducting wire is directed toward the connection part with the conducting wire, positioned on the side reverse to the coil part, without being directed to the direction of the coil part, which is different from the conventional art. Further, the conducting wire from the connection part is configured to be guided in a direction opposite to the wiring part and diverted, and then guided to the wiring part.

Therefore, according to the coil component and the method for producing the coil component of the present invention, stress applied to the conducting wire can be dispersed thereon even in a state in which there is no room in terms of a space in which the conducting wire is run by being extended along the profile of the coil component in association with size reduction of the coil component or the like. Simultaneously therewith, the risk of causing the point-to-point construction can be excluded, and occurrence of disconnection in the molding process or the like can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Hereinafter, a coil component according to an embodiment of the present invention will be described with reference to drawings. The coil component of the present embodiment is applied to a solenoid valve, for example.

The solenoid valves are components which are used as electrical circuit elements in various devices to be mounted in automobiles, for example, and some are subjected to overmolding for waterproofing and dustproofing. In such solenoid valves, a conducting wire is to be subjected to significant stress depending on a difference in a thermal expansion coefficient between a mold resin and the conducting wire. In particular, when a request for size reduction is exigent on the coil component, or the like, if the conducting wire is formed into a point-to-point construction, a risk of occurrence of disconnection of the conducting wire is significant.

Therefore, the conducting wire is configured not to be directly delivered from a terminal electrode to a coil part in the coil component according to the present embodiment. Specifically, the conducting wire from the terminal electrode is once led out in a direction reverse to a direction of a wiring part and diverted in a manner of extending along each part of a base part made of resin, which is formed in an upper part of the coil component. Then, the point-to-point construction is not to be caused by supplying the conducting wire to the wiring part.

Hereinafter, a coil component 1 according to the present embodiment will be described by using FIG. 1.

The coil component 1 is provided with a bobbin 2, a pair of terminal electrodes 3A, 3B, a conducting wire 4, a yoke 5, and a base part 9 along which the conducting wire 4 is extended and run.

The bobbin 2 is molded by using a thermoplastic resin such as 6, 6-nyron in taking into account moldability, mass productivity, microfabrication performance, electrical insulation, inexpensiveness, mechanical strength, and the like. Moreover, a thermosetting resin can also be used.

Moreover, the bobbin 2 has a winding core part 6 (see FIG. 6) around which the conducting wire 4 is wound, and flange parts 7, 8 formed in both end parts of the winding core part 6, and is further integrally molded with the base part 9 which is continued from the flange part 7, and is formed of the plastic resin. In addition, a wiring part 20 is configured in which the conducting wire 4 is wound around the winding core part 6. Moreover, the flange part 7 can be appropriately provided with a notch part 7A as described later.

A pair of terminal electrodes 3A, 3B are formed into a symmetrical shape to each other, and are formed by punching of a metal plate of phosphor bronze, brass, or the like. The first terminal electrode 3A has a terminal electrode body 11A, and a connection piece 13A projected upward from the terminal electrode body 11A. On the other hand, the second terminal electrode 3B has a terminal electrode body 11B, and a connection piece 13B projected upward from the terminal electrode body 11B.

The terminal electrode bodies 11A, 11B are pressed into the base part 9 which is continued from the flange part 7. The first and second terminal electrodes 3A, 3B are fixed onto the bobbin 2 by pressing the terminal electrode bodies 11A, 11B into the base part 9. The connection pieces 13A, 13B are continued to upper parts of the terminal electrode bodies 11A, 11B and are electrically connected with an external power source.

Moreover, the conducting wire 4 is formed of a wire rod of copper, aluminum or the like coated with an insulation coating.

In addition, for the insulation coating, a material which melts by heating, application of an organic solvent, or irradiation with ultraviolet light is used. The conducting wire 4 is wound around the winding core part 6 in the number of turns according to which desired electromagnetic characteristics are obtained.

Figure 1:
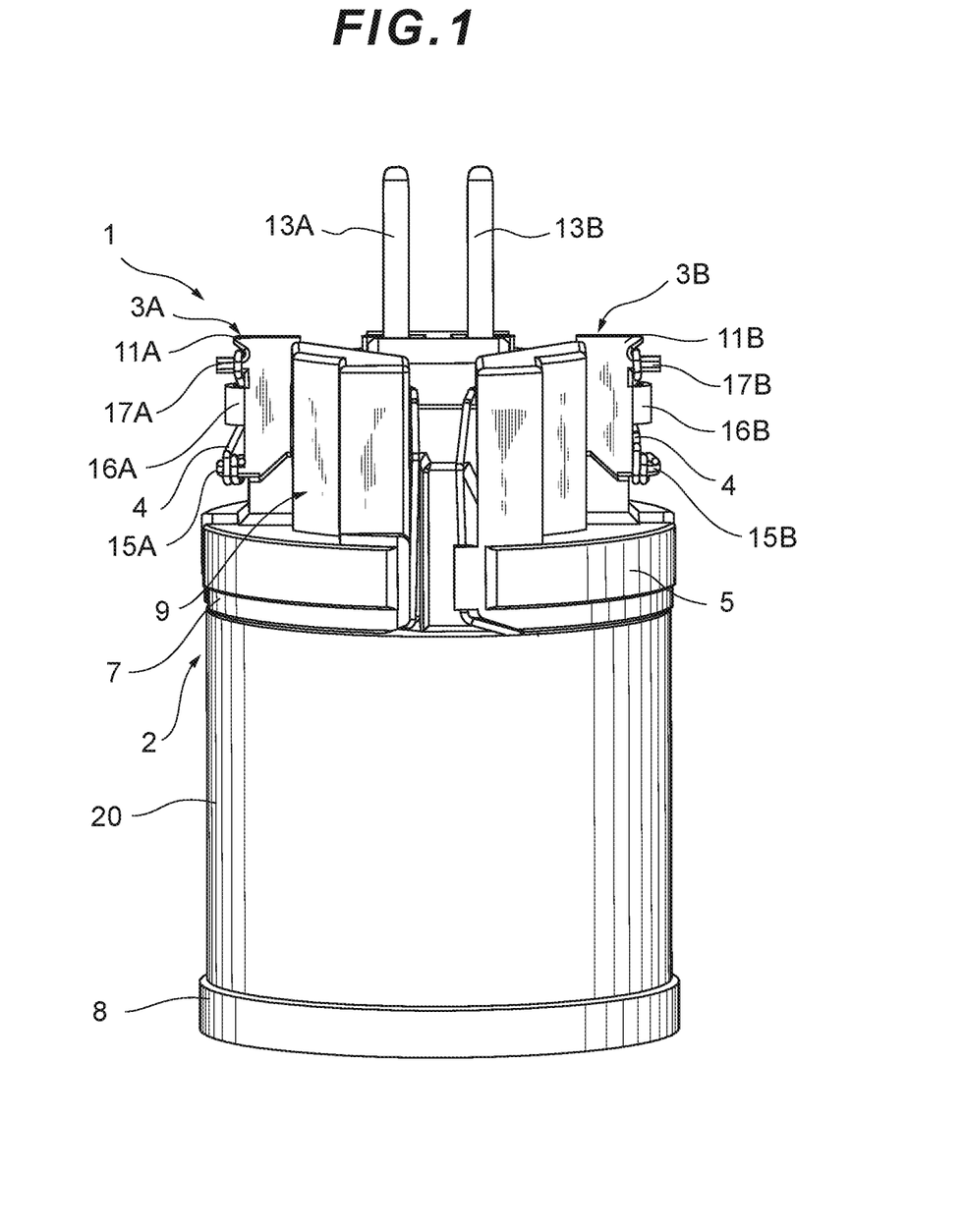
FIG. 1 is a front view showing a coil component according to an embodiment of the present invention.

Moreover, the yoke 5 is provided in order to enhance electromagnetic action of the coil component 1, and formed into a shape provided with the flange part (a surface on which an outermost surface appears in FIG. 1 is taken as a circumferential surface), for example, and formed by a technique such as burring pressing. Moreover, the yoke 5 is integrally formed with the bobbin 2 by insert molding. In addition, the yoke 5 can be appropriately provided with a notch part 5A as described later.

Moreover, the notch part 7A described above is provided in a position of the flange part 7 in corresponding to the notch part 5A.

Moreover, the base part 9 is formed of a plastic resin such as 6,6-nylon, and is integrally molded with the bobbin 2, and is provided with a shape along which the conducting wire 4 is extended, and run as described below.

Next, the terminal electrode body 11A on a starting end side will be described by using FIG. 2.

As described above, the terminal electrode body 11A is embedded in the base part 9, and the terminal electrode body 11A is exposed from a side surface of the base part 9 in a manner of being laterally projected. In the terminal electrode body 11A, a locking piece 15A, a connection terminal 16A (corresponding to a wire connection part in claim 1), and a wire support part 17A are arranged at a predetermined position in a projecting manner, in the order from below, in the lateral direction of a vertically elongated flat plate part 14A. Moreover, part of the vertically elongated flat plate part 14A makes surface contact with the base part 9. In addition, the vertically elongated flat plate part 14A is formed by press blanking, and therefore is set to a thickness at a level equal to or greater than a thickness of the terminal in order to prevent twisting during the press blanking, for example.

Here, the locking piece 15A refers to the bent rod-shaped locking piece 15A in which a part on a side of a wire starting end part 4A of the conducting wire 4 is first locked (wound therearound). Moreover, the connection terminal 16A is electrically connected, by caulking and resistance welding, with the conducting wire 4 locked to the locking piece 15A. Moreover, the connection terminal 16A is formed into a J-shaped belt form in cross section in such a manner that the conducting wire 4 can be included therein over a predetermined distance. Further, the wire support part 17A is formed into a rod shape that extends outward and laterally in such a manner that the conducting wire 4 from the connection terminal 16A can be wound therearound one half.

Moreover, a portion above the wire support part 17A in the vertically elongated flat plate part 14A is formed as a wide part 18A which is laterally elongated. A portion of the wide part 18A on a side of the wire support part 17A is obliquely notched, which is combined with a top surface of a tip part of the wire support part 17A, and a V-shaped notch part 19A is formed.

Into the V-shaped notch part 19A, the conducting wire 4 is fitted, and then the V-shaped notch part 19A functions as a holding part for the conducting wire 4 upon delivery of the conducting wire 4 to a direction of the base part 9.

Figure 2:
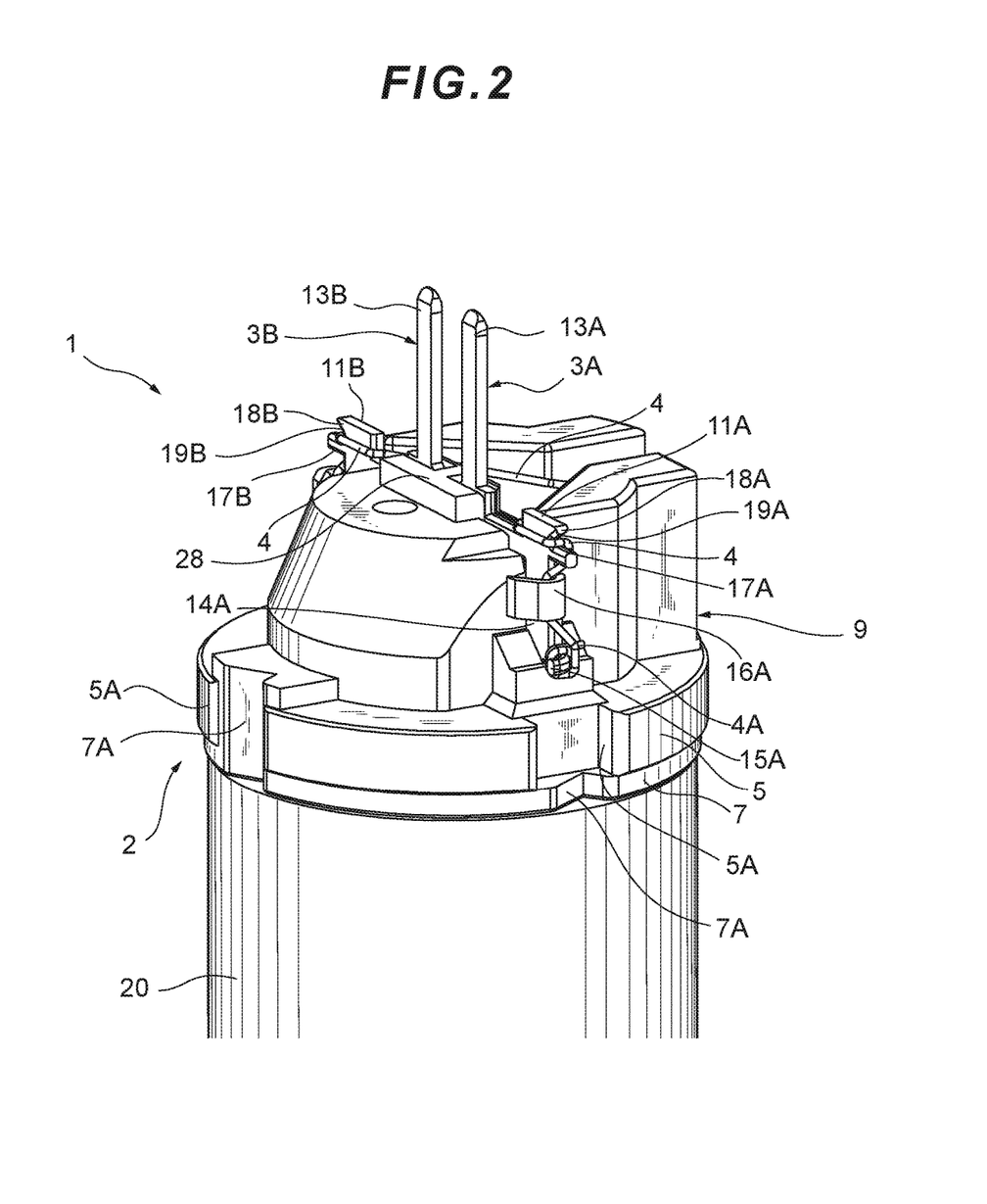
FIG. 2 is a diagram showing a terminal electrode to which a starting end side of a conducting wire of a coil component according to an embodiment of the present invention is connected.

In FIG. 2, with regard to a shape of the conducting wire 4 passing from the locking piece 15A through the connection terminal 16A to the wire support part 17A and the V-shaped notch part 19A, the conducting wire 4 is not tightly stretched linearly from the locking piece 15A toward the wire support part 17A or from the locking piece 15A toward the V-shaped notch part 19A. The conducting wire 4 is configured in a manner of being formed into a bent shape by being held by the connection terminal 16A, and extended along a side part of the vertically elongated flat plate part 14A by tension and delivered in a direction (upper direction in FIG. 2) reverse to the direction of the wiring part 20.

Figure 3:
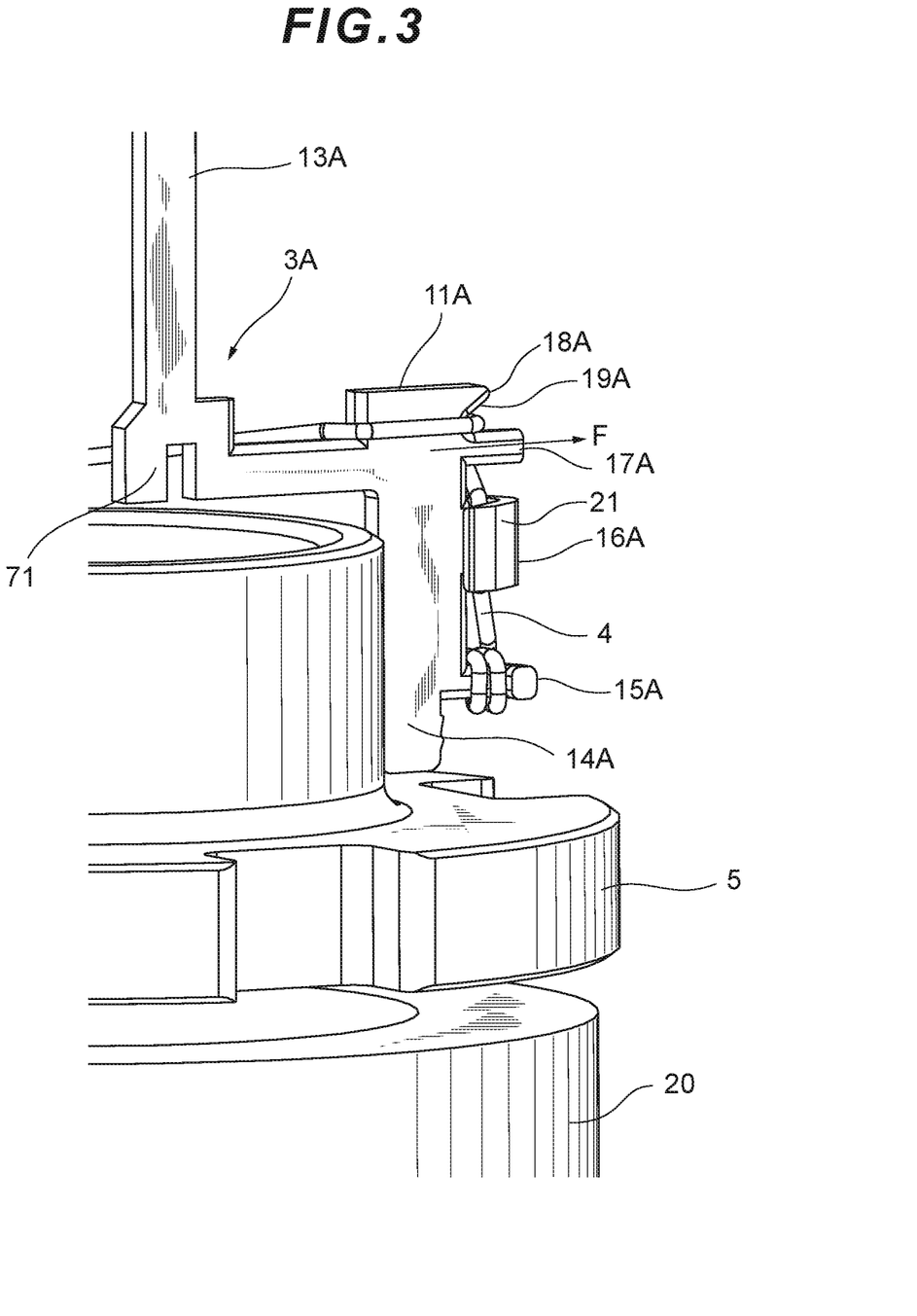
FIG. 3 is a diagram showing an enlarged terminal electrode for wire connection on the starting end side shown in FIG. 2.

FIG. 3 is a diagram showing the terminal electrode portion 3A on the wire starting end side shown in FIG. 2 in a state in which the base part 9 is eliminated to show an aspect in which a strength reinforcement part 71 is provided in a root portion of the connection piece 13A of the terminal electrode 3A.

In the strength reinforcement part 71, a leg portion for improving strength of bonding of the terminal electrode 3A with the base part 9 is formed into an "n" shape. The n-shaped leg portion is fitted into the base part 9 to be effective for the terminal electrode 3A to be strongly held in a predetermined position on the base part 9 against force F by which the terminal electrode 3A is laterally drawn out. More specifically, a portion embedded in the base part 9 is small in the vertically elongated flat plate part 14A, and therefore the strength reinforcement part 71 is provided in order to maintain the strength of bonding of the vertically elongated flat plate part 14A with the base part 9, in other words, the strength of connection of the terminal electrode 3A with the base part 9.

Next, the base part 9 will be described by using FIG. 4.

As described above, the base part 9 is integrally formed with the bobbin 2 on a top surface of the bobbin 2. The base part 9 is provided with, on a front side thereof, wire guide wall parts 24A, 24B provided in a bilaterally-symmetrical shape for guiding the conducting wire 4 onto a side of the wiring part 20, and a V-shaped inclined part 25 interposed between the two wire guide wall parts 24A, 24B. Simultaneously, the coil component 1 is provided with a pedestal-shaped flat part 26 on a back side of the base part 9, and in a substantially central part of the pedestal-shaped flat part 26, a through-hole 27 is provided, serving as an air escape way, a hole through which a lug of a fixture is passed, or a positioning part for attaching the fixture thereto during production.

Further, a rib part 28 is provided on the pedestal-shaped flat part 26 in a manner of being projected from the pedestal-shaped flat part 26 so as to surround three surfaces (a front surface, a rear surface, and one side surface) for each of connection piece fitting holes 61A, 61B. When viewed from the top surface, the rib part 28 is viewed to be in an H-shaped form. Leg parts of the connection pieces 13A, 13B are fitted into the connection piece fitting holes 61A, 61B on both sides of the rib part 28 to fix the terminal electrodes 3A, 3B to the base part 9.

In addition, upon producing the terminal electrodes 3A, 3B, a plurality of pieces of terminal electrodes each having the same shape are punched from a hoop serving as a base material for the purpose of improving production efficiency, and therefore infinitesimal deformation occurs in the same punching direction for all the terminal electrodes. However, both of a pair of terminal electrodes 3A, 3B each having the same shape are fitted into the base part 9 and used in a direction of inverting one of the terminal electrodes 3A, 3B relative to the other in the actual coil component 1 in such a manner that the terminal electrodes 3A, 3B are formed into line symmetry to each other. Therefore, in association with the deformation of the terminal electrodes 3A, 3B, the terminal electrodes 3A, 3B are to be projected from the surfaces of the terminal electrodes 3A, 3B in such a manner that one is directed toward a front face side of the coil component and the other is directed toward a back surface side of the coil component 1.

If the terminal electrodes 3A, 3B are fitted into the base part 9 in a state in which the deformation thus occurs, directions of projection by the deformation are reversed to each other in the two terminal electrodes 3A, 3B, and therefore the two connection pieces 13A, 13B are liable to be inclined in directions reverse to each other.

To solve such a problem, the rib part 28 surrounding the three surfaces (the front surface, the rear surface, and one side surface) for each of the connection pieces 13A, 13B is provided, in which a hole width of the connection piece fitting holes 61A, 61B each is set to be substantially equal to a thickness of the connection pieces 13A, 13B each to eliminate a gap between both as much as possible, and the connection pieces 13A, 13B are clamped from both surface sides. The rib part 28 is provided on the base part 9 so as to have a height with a predetermined value or more (height at which the connection piece fitting holes 61A, 61B deep enough can be formed at a degree at which inclination of the connection pieces 13A, 13B can be suppressed) to increase depth of the connection piece fitting holes 61A, 61B each. Thus, even if the deformation occurs, the inclination of the connection pieces 13A, 13B can be suppressed.

Thus, an influence of the deformation on the inclination of the connection pieces 13A, 13B is suppressed, and both can be aligned in a manner of extending in a vertical direction (axial direction of the wiring part).

Moreover, the V-shaped inclined part 25 described above is formed into a smoothly inclined surface in a descending manner toward the front surface side. Side wall surfaces of the wire guide wall parts 24A, 24B on a side of the V-shaped inclined part 25 are applied as wire guide wall surfaces 23A, 23B, respectively. In addition, the top surfaces of wire support parts 17A, 17B and the following V-shaped inclined part 25 are formed to be flush with each other in a boundary part therebetween.

Next, a longitudinal groove part 30 will be described by using FIG. 5.

The base part 9 is provided with the longitudinal groove part 30 continuing to the V-shaped inclined part 25.

More specifically, the coil component is configured in such a manner that the conducting wire 4 is held by the longitudinal groove part 30 in a region between the V-shaped inclined part 25 and the wiring part 20.

Figure 5:
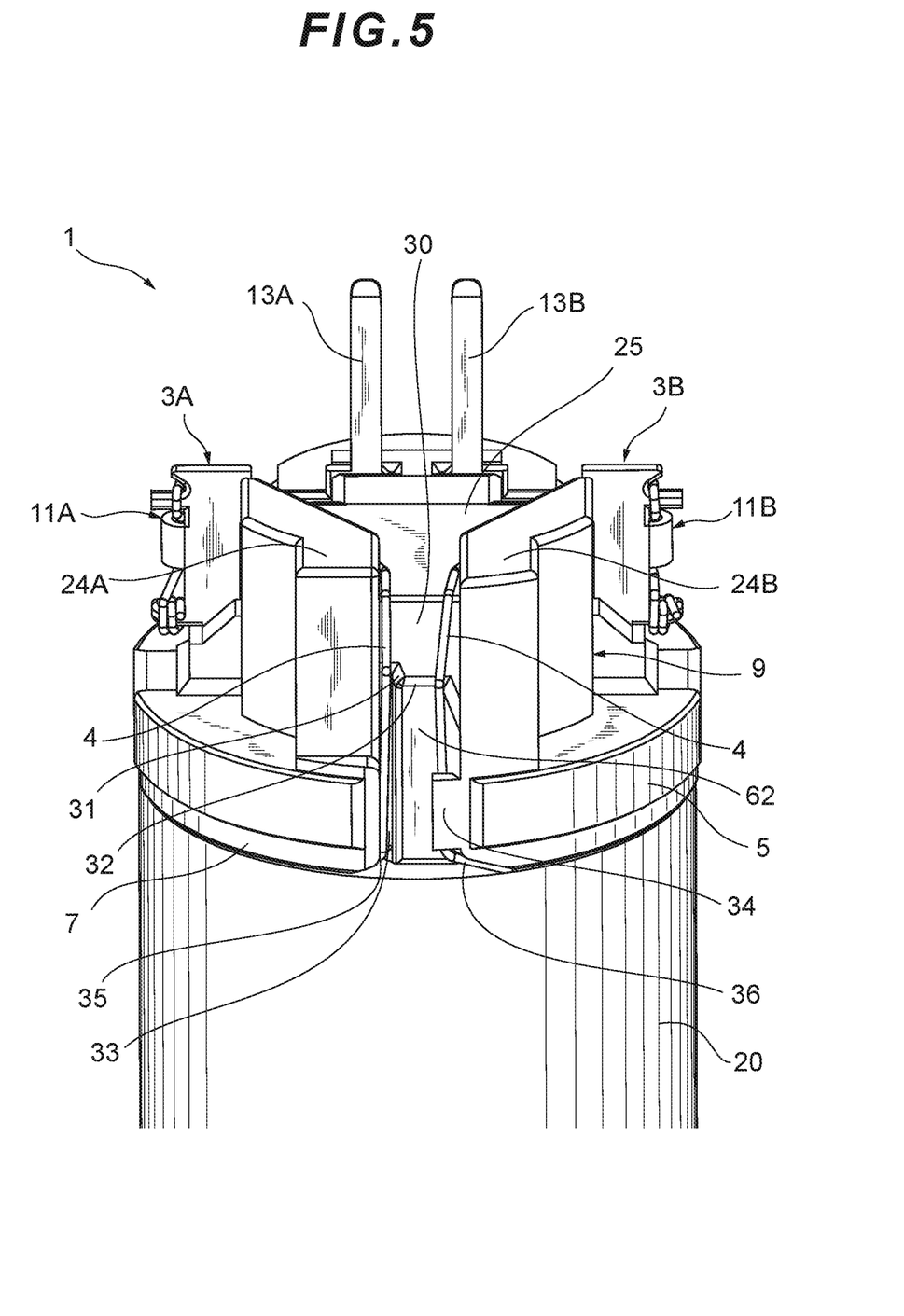
FIG. 5 is a diagram showing a conducting wire guide part formed on a front side in a coil component according to an embodiment of the present invention.

Moreover, a first step part 31 and a second step part 32 each having a predetermined thickness are formed in a region on a side near the wiring part 20 on a bottom surface of the longitudinal groove part 30 (surface directed toward a front surface side in FIG. 5). In the first step part 31, a lead groove 33 formed into such a shape according to which the conducting wire 4 on the starting end side is fitted thereinto is formed. Moreover, the second step part 32 is provided with a pedestal-shaped part 62 formed of a flat surface to be higher than the first step part 31 by a predetermined amount, and the conducting wire 4 on the terminating end side is guided along the flat surface of the pedestal-shaped part 62. Thus, consideration is given in such a manner that insulation is ensured by configuring the conducting wire 4 on the starting end side, and the conducting wire 4 on the terminating end side not to be excessively come close.

Moreover, an eaves part 34 projecting from a side of the wire guide wall part 24B toward a side of the wire guide wall part 24A is provided in such a manner that the conducting wire 4 on the terminating end side can be held in a manner of being prevented from dropping from the longitudinal groove part 30 upon running the conducting wire 4 on the terminating end side.

Moreover, the conducting wire 4 on the starting end side is configured to be led into a side of the wiring part 20 from a wire lead-in port 35 of the flange part 7, and the conducting wire 4 on the terminating end side is formed to be led out from the side of the wiring part 20 through a wire lead-out port 36 of the flange part 7.

Figure 6:
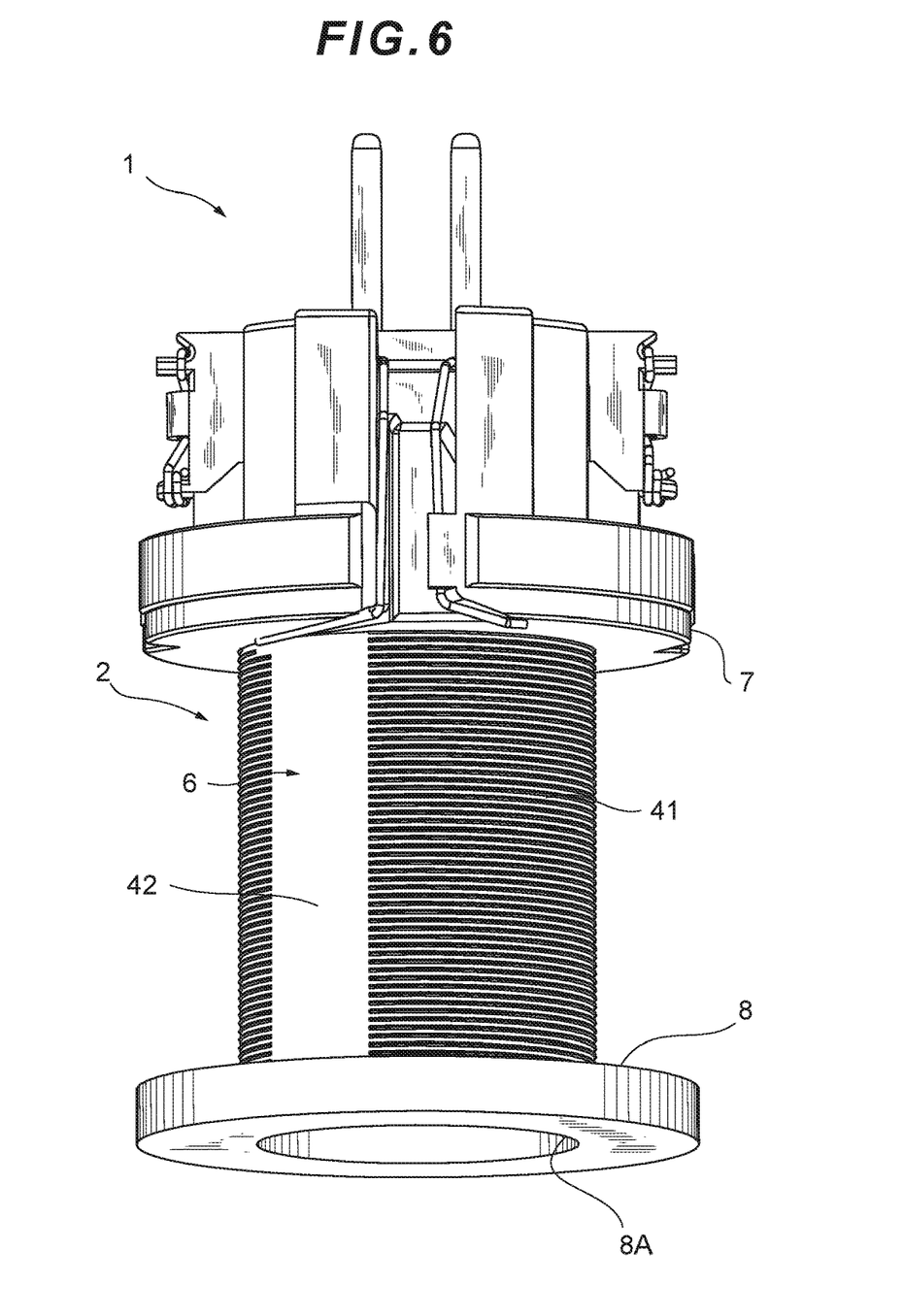
FIG. 6 is a diagram showing a configuration for guiding a conducting wire onto a bobbin side in a coil component according to an embodiment of the present invention.

Next, FIG. 6 shows an aspect in which the conducting wire 4 on the starting end side is led in the wiring part 20 (wound around the bobbin 2), and the conducting wire 4 on the terminating end side is led out from the wiring part 20 (wound around the bobbin 2).

In FIG. 6, a form is applied in which illustration of the conducting wire 4 wound around the wiring part 20 is omitted for convenience of visibility.

As shown in FIG. 6, an aspect is shown in which the conducting wire 4 on the starting end side is guided along an inner wall surface of the flange part 7 to an innermost circumferential position of the winding core part 6 in an uppermost part thereof, and the conducting wire 4 on the terminating end side is led out from an outermost circumferential part of the winding core part 6 in the uppermost part thereof to a side of the longitudinal groove part 30 described above.

In addition, a wiring groove 41 in corresponding to each conducting wire 4 is formed on an outer circumferential surface of the winding core part 6 in such a manner that the conducting wire 4 is smoothly wound therearound. When the wiring groove 41 is viewed in a perspective manner from a direction in which an axis of the bobbin 2 extends, the wiring groove 41 is viewed to be substantially in a C-shaped form. A portion corresponding to a "C"-shaped notch port is provided with a wire transition part 42. The wire transition part 42 plays a role of delivering winding of the conducting wire 4 from one wiring groove 41 to the adjacent wiring groove 41 in order to configure an aligned winding wire. In other words, a new winding of the conducting wire 4 is started in the wire transition part 42.

Next, the terminal electrode body 11B on the terminating end side will be described by using FIG. 7.

As described above, the terminal electrode 3B is formed in a symmetrical shape to each other relative to the terminal electrode 3A described above, and the terminal electrode body 11B is also formed in the symmetrical shape to each other relative to the terminal electrode body 11A described above, and others are formed in a similar manner. Accordingly, in order to avoid complication of description, a member having a similar function is shown by rewriting a symbol with A of a symbol of the terminal electrode body 11A to a symbol with B, and the detailed description of shape thereof will be omitted.

Figure 7:
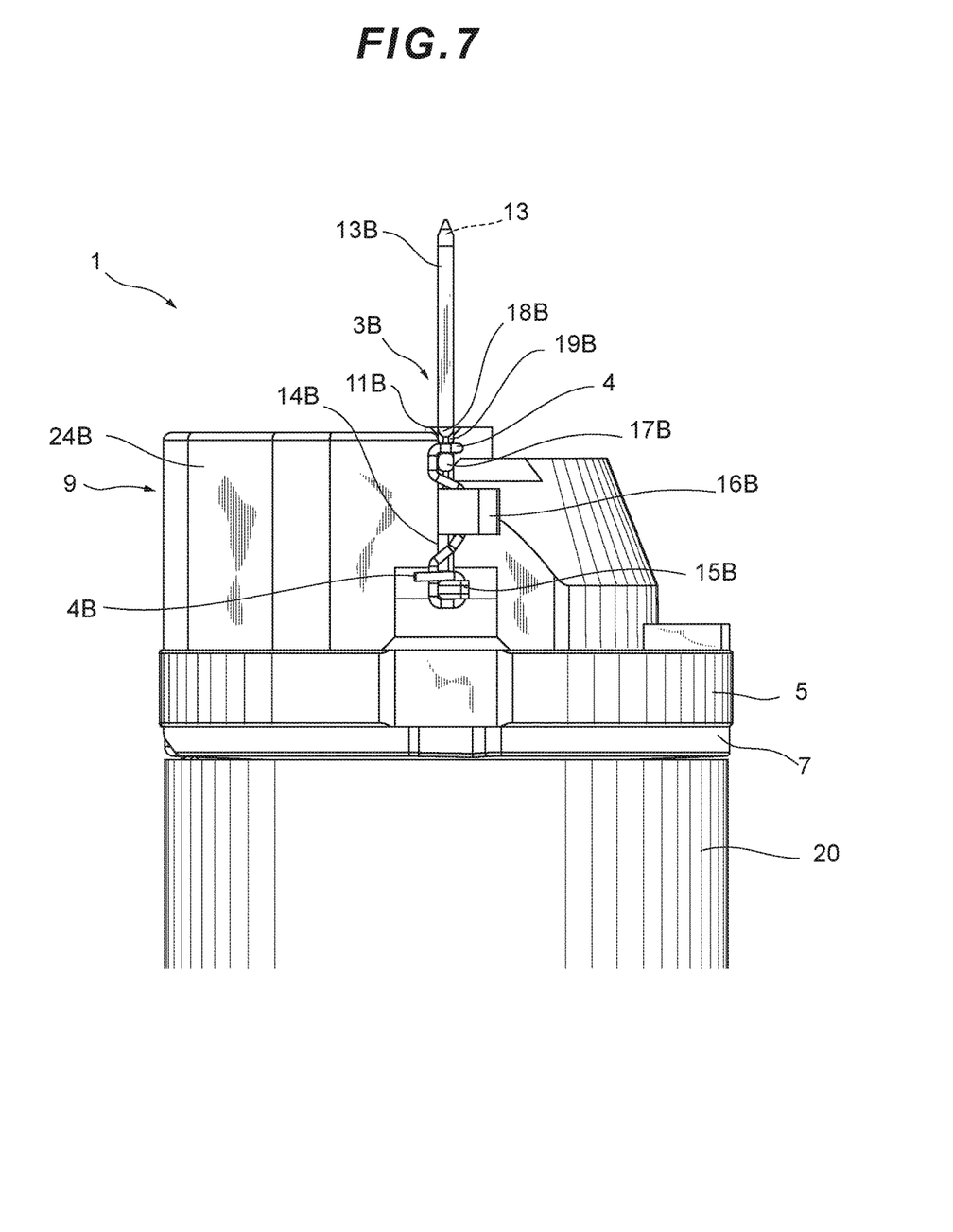
FIG. 7 is a diagram showing a terminal electrode to which a part on a terminating end side of a conducting wire is connected in a coil component according to an embodiment of the present invention.

As shown in FIG. 7, in the terminal electrode body 11B, a wide part 18B, a V-shaped notch part 19B, a wire support part 17B, a connection terminal 16B, and a locking piece 15B around which a wire terminating end part 4B is finally wound are formed from above an outer side part of the terminal electrode body 11B toward a lower side.

As a result, the conducting wire 4 on the terminating end side is to be run and held along the members described above.

In addition, in a manner similar to the case of the terminal electrode body 11A, also in the terminal electrode body 11B, the conducting wire 4 is run among the members in a meandering manner, fixed at the connection terminal 16B by caulking and resistance welding, and tightly stretched and held. Moreover, the terminal electrode body 11B is formed in a bilaterally reverse manner relative to the terminal electrode body 11A in arrangement positions, bending directions, or the like of the members each, and therefore a direction of meandering of the conducting wire 4 is reversed.

Figure 8:
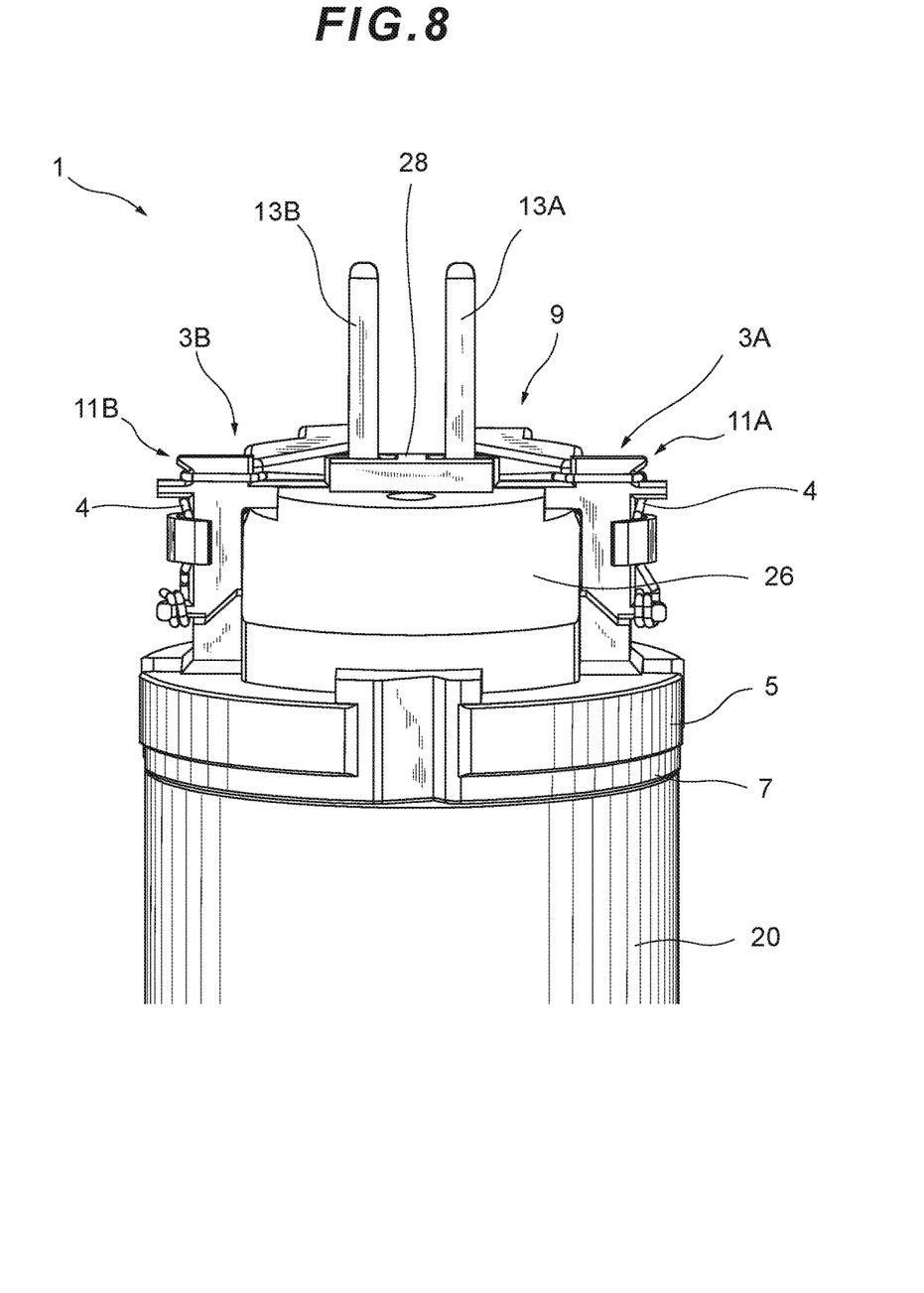
FIG. 8 is a diagram showing a back surface of a coil component according to an embodiment of the present invention.

Next, FIG. 8 shows a shape of a back surface of the base part 9.

A region on a side of the back surface of the base part 9 is provided with a pedestal-shaped flat part 26 which covers an outside of a cylindrical part above the flange part of the yoke 5 shown in FIG. 3. The pedestal-shaped flat part 26 is formed in such a manner that a side surface thereof is formed by part of a side surface of a substantially frustum of a cone to be thinner with directing toward upward. Thus, an upper portion thereof is formed thinner, thereby allowing a nozzle tip serving as a wire delivery port to easily move without allowing the nozzle tip to collide with the side surface of the pedestal-shaped flat part 26 upon running the conducting wire 4 by an automatic winder.

Moreover, in the coil component 1 configured as described above, an overmolded exterior part is coated with a resin agent, and waterproofing is applied thereto. Infiltration of moisture such as rain from outside into the coil component 1 can be prevented by providing the exterior part, occurrence of unforeseen circumstances such as short circuiting inside the coil component 1 can be prevented by such configuration. The exterior part can be formed of a plastic resin such as 6.6-nylon into a thickness of about 1 mm or less, for example.

Next, a step of running the conducting wire 4 from a starting end to a terminating end, and also a step of resin sealing by the exterior part will be described by using FIGS. 2 to 8 again.

As shown in FIGS. 2 and 3, the wire starting end part 4A of the conducting wire 4 is first locked to the locking piece 15A in a manner being wound therearound, and then the conducting wire 4 is passed into a bending terminal part 21 of the connection terminal 16A, and wound around one half the wire support part 17A on a front surface side of the coil component 1, and then passed through the V-shaped notch part 19A, and led out onto the back surface side of the coil component 1. Then, the conducting wire 4 is transited on the back surface side of the wide part 18A at a height same with the height of the top surface of the wire support part 17A, and led out onto the front surface side of the coil component 1 with extending along a side surface of the wide part 18A on a side of the connection piece 13A.

In addition, as described above, after all of winding operation of the conducting wire 4 (including processing of locking of the conducting wire 4 to the locking piece 15A and processing of winding of the conducting wire 4 to the wire support part 17A, and the like) are finished, caulking and resistance welding of the conducting wire 4 are performed at the connection terminal 16A, and electrical connection between the conducting wire 4 and the connection terminal 16A is to be ensured. In the processing of caulking described above, the bending terminal part 21 is caulked with a caulking device (not shown) in a state in which the conducting wire 4 is passed through the bending terminal part 21 described above to clamp the conducting wire 4. In the processing of resistance welding, the conducting wire 4 and the bending terminal part 21 are welded by applying pressure while an electric current is passed through the connection terminal 16A.

In addition, caulking and resistance welding of the conducting wire 4 are performed in a similar manner also in the connection terminal 16B.

In the present embodiment, the locking piece 15A is provided, and therefore the wire starting end part 4A of the conducting wire 4 can be locked thereto. Further, processing of running of the conducting wire 4 can be performed in this state, and therefore manufacturability can be improved.

Moreover, the conducting wire 4 can be wound around the wire support part 17A by providing the wire support part 17A which projects in an outer side part. Further, the conducting wire 4 can be fitted into the V-shaped notch part 19A and held therein by forming the V-shaped notch part 19A between the wide part 18A and the wire support part 17A. Moreover, the conducting wire 4 can be adhered onto an outer surface of the terminal electrode 3A to disperse stress applied to the conducting wire 4 by any one of the configurations described above. Even if it should be difficult to ensure a space in which the conducting wire 4 is entangled, disconnection of the conducting wire 4 during use in an environment in which temperature conditions in an engine compartment and the like are harsh can be prevented.

More specifically, as described above, the conducting wire in the coil component according to the conventional art is configured to be directly delivered from the terminal electrode on the starting end side to the wiring part, and therefore particularly when size reduction of a product is achieved, the point-to-point construction is easily caused. However, according to the present embodiment, the conducting wire 4 is configured to be once run from the terminal electrode 3A on the starting end side of the conducting wire 4 in a direction opposite to the wiring part 20 (upper direction in FIG. 3), and a structure as described above in which the conducting wire 4 is extended therealong (a structure in manner of allowing laying or adhesion winding, and stress dispersion) can be formed to prevent the disconnection of the conducting wire 4 during the use in the environment in which the temperature conditions in the engine compartment and the like are harsh.

Figure 4:
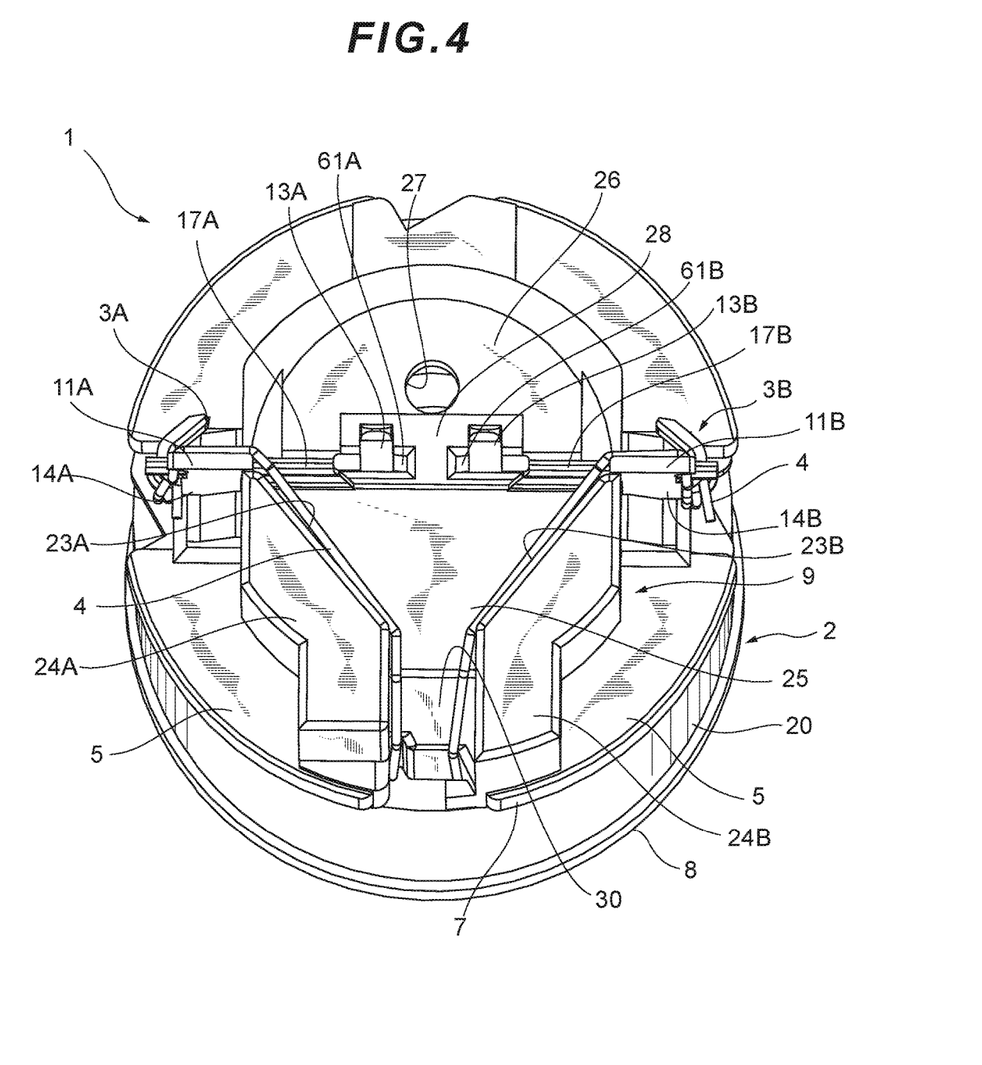
FIG. 4 is a diagram showing a conducting wire guide part formed on a top surface side in a coil component according to an embodiment of the present invention.

Next, the conducting wire 4 on the starting end side, which is led out from the back surface side of the wide part 18A to the front surface side of the coil component 1 through a space between the wide part 18A and the connection piece 13A, is guided to the V-shaped inclined part 25 of the base part 9, as shown in FIG. 4.

The conducting wire 4 extends along the surface of the V-shaped inclined part 25 and simultaneously along the surface of the wire guide wall surface 23A of the wire guide wall part 24A to be guided therealong to descend an inclined surface, and led to the longitudinal groove part 30.

In addition, as described above, when the conducting wire 4 is led out onto the front surface side, the conducting wire 4 is to be transited from the top surface of the wire support part 17A to the surface of the V-shaped inclined part 25. However, as described above, the top surface of the wire support part 17A and the surface of the V-shaped inclined part 25 are set to a height flush with each other, and therefore the conducting wire 4 is smoothly delivered from the surface of the V-shaped inclined part 25 to the top surface of the wire support part 17A. Thus, the stress caused by thermal shock or the like is not concentrated on both end parts being the support part, which is different from the point-to-point construction, and can be dispersed onto the top surface of the wire support part 17A and the surface of the V-shaped inclined part 25, and the disconnection of the conducting wire 4 can be prevented.

The conducting wire 4 on the starting end side, which is guided to the longitudinal groove part 30 by the V-shaped inclined part 25, is supported in an edge part of the V-shaped inclined part 25 and run in a manner of substantially vertically descending the longitudinal groove part 30, as shown in FIG. 5.

As described above, in the longitudinal groove part 30, the first step part 31 provided with the lead groove 33 is formed. Moreover, the conducting wire 4 is guided to a position of the flange part 7 of the bobbin 2, which is integrally formed with the base part 9, in a manner of being fitted into the lead groove 33, and is led into the flange part 7 through the wire lead-in port 35.

Thus, the wiring part 20 on the starting end side, which is led into the flange part 7, is guided to a position of the winding core part 6 (innermost circumference position) along the inner wall surface of the flange part 7, as shown in FIG. 6.

Then, the conducting wire 4 is wound around the winding core part 6 over a plurality of layers by a known winding method to form the wiring part 20. However, illustration of the wiring part 20 is omitted in FIG. 6 for convenience of description.

The conducting wire 4 is guided again along the inner wall surface of the flange part 7 from the outermost circumference of the wiring part 20, and then led out to the longitudinal groove part 30 through the wire lead-out port 36 (see FIG. 5).

The conducting wire 4 on the terminating end side, which is led out to the longitudinal groove part 30 through the wire lead-out port 36, is run in a manner of being passed through a space between the pedestal-shaped part 62 of the second step part 32 and the eaves part 34, and is then guided in a manner of extending along the surface of the V-shaped inclined part 25 from the edge part of the V-shaped inclined part 25, as shown in FIG. 5.

Thus, in order to simplify a structure of the base part 9, a configuration is formed in the longitudinal groove part 30, in which, while the conducting wire 4 on the starting end side and the conducting wire 4 on the terminating end side are guided by one longitudinal groove part 30, a distance between both of the conducting wires 4 is ensured to improve insulation.

More specifically, with regard to a relationship of height between the first step part 31 and the second step part 32 in the longitudinal groove part 30, the second step part 32 is set to be higher than the first step part 31 by one step, and the conducting wire 4 on the starting end side is fitted into the lead groove 33 and held on a left end side of the longitudinal groove part 30 in the figure. On the other hand, then, the conducting wire 4 on the terminating end side, which is guided in a manner of extending along the wire guide wall surface 23B of the wire guide wall part 24B, is to be positioned on a right end side of the longitudinal groove part 30 in the figure (the right end side of the second step part 32). Accordingly, both the conducting wires 4 are separated from each other with a predetermined distance therebetween, which is advantageous in ensuring withstand voltage and insulation resistance.

Moreover, the conducting wire 4 on the starting end side is fitted into the lead groove 33 and held therein. Thus, operation of winding the conducting wire 4 around the winding core part 6 is then facilitated.

The conducting wire 4 on the terminating end side, which is guided in a manner of extending along the surface of the V-shaped inclined part 25, is pulled up in a manner of ascending the inclined surface to the top surface of the wire support part 17B of the terminal electrode 3B in a manner of extending along the surface (bottom surface) of the V-shaped inclined part 25, and simultaneously along the wire guide wall surface 23B of the wide guide wall part 24B, as shown in FIG. 4. Then, the conducting wire 4 is run, along the surface on the back surface side of the wide part 18B of the terminal electrode body 11B on the terminating end side, to the V-shaped notch part 19B on the terminating end side shown in FIG. 7.

In addition, the surface of the V-shaped inclined part 25 and the top surface of the wire support part 17B are formed to be flush with each other, and therefore the conducting wire 4 is smoothly delivered from the surface of the V-shaped inclined part 25 to the top surface of the wire support part 17B. Thus, the stress caused by thermal shock or the like is not concentrated on both end parts being the support part, which is different from the point-to-point construction, and can be dispersed onto the top surface of the wire support part 17B and the surface of the V-shaped inclined part 25, and a risk of disconnection in the delivery portion can be prevented.

The conducting wire 4 on the terminating end side, which is run to the V-shaped notch part 19B on the terminating end side, is then wound around one half the wire support part 17B on the terminating end side, passes into the connection terminal 16B, and is finally locked to the locking piece 15B, as shown in FIG. 7.

Processing of running of the conducting wire 4 in the terminal electrode body 11B on the terminating end side, and processing of caulking and resistance welding of the conducting wire 4 in the connection terminal 16B are the same with the processing of running of the conducting wire 4 in the terminal electrode body 11A on the starting end side, and the processing of caulking and resistance welding of the conducting wire 4 in the connection terminal 16A as described above, and therefore the detailed description thereof will be omitted.

However, the conducting wire 4 is run in such a manner that a shape reverse to the shape in the case of the terminal electrode body 11A on the starting end side described above is formed in a meandering aspect of the conducting wire 4 in the wire support part 17B, the connection terminal 16B, and the locking piece 15B.

Moreover, the conducting wire 4 on the terminating end side is locked to the locking piece 15B, and then cut into a predetermined length by using a cutter or the like.

Then, resin molding is performed by using various resin agents such as 6, 6 nylon in such a manner that the coil component 1 as a whole is covered therewith. At this time, a melted resin material is injected into a mold to bury all empty spaces inside the mold with a resin material by pressure. In this case, the large notch part 5A is appropriately formed in the yoke 5 so as to create such a flow path through which all the spaces are linked. Moreover, the notch part 7A having a small cross-sectional area is provided in a place of the flange part 7 in corresponding to the notch part 5A of the yoke 5 so as to prevent applying excessively large pressure to the wiring part 20. Thus, a flow of the resin material inside the mold can be ensured, and also an adverse influence on the wiring part caused by the pressure can be suppressed to a minimum.

In this case, a thickness of the mold is preferably reduced as much as possible (for example, 1 mm or less) in order to achieve high efficiency of the resin material and size reduction of the product. However, if even a small unmolded portion is present, moisture is infiltrated into the coil component 1 from the portion to cause short circuiting or the like, and therefore it is important to be securely overmolded over the entire surface of the coil component 1.

With regard to the coil component and the method for producing the coil component according to the present invention, the conducting wire 4 is not directly led from the terminal electrode 3A into the wiring part 20. The conducting wire 4 is once run on a side reverse to the terminal electrode 3A, namely, in the base part 9 on which the structure along which the conducting wire 4 extends can be formed, and then led into the wiring part 20. Thus, the conducting wire 4 can be prevented from being formed into the point-to-point construction. Simultaneously, the coil component is configured in such a manner that the stress applied to the conducting wire 4 can be dispersed, and the disconnection of the conducting wire 4 can be prevented upon use in the environment in which the temperature conditions in the engine compartment and the like are harsh.

Accordingly, the coil component only needs have the configuration according to which the object can be achieved, and as the shapes of the terminal electrodes 3A, 3B and the base part 9, shapes of various types can be adopted.

For example, in the embodiment described above, the conducting wire 4 is configured to be wound around the circumferential surfaces in the wire support parts 17A, 17B in the terminal electrodes 3A, 3B. However, in place of the wire support parts 17A, 17B, the conducting wire 4 may be supported by a wire support member formed into a different shape.

Moreover, the V-shaped notch parts 19A, 19B can be omitted, or replaced by other conducting wire holding members.

Moreover, in the embodiment described above, the conducting wire 4 and the connection terminals 16A, 16B in the terminal electrodes 3A, 3B are electrically connected by applying the resistance welding, but other types of welding such as laser welding or a connection technique such as soldering can also be applied.

Moreover, in the embodiment described above, the yoke 5 is arranged at a predetermined position inside the mold, but the yoke 5 may be arranged at a predetermined position outside the mold in such a manner that overmolding is performed on the coil component 1, and then the yoke 5 is covered from outside.

Moreover, in the embodiment described above, the wire lead-in port 35 to the wiring part 20 of the conducting wire 4 on the starting end side, and the wire lead-out port 36 from the wiring part 20 of the conducting wire 4 on the terminating end side are close to each other, and the conducting wire 4 on the starting end side and the conducting wire 4 on the terminating end side are configured to be guided by using the same longitudinal groove part 30. However, when the longitudinal groove parts for the conducting wire on the starting end side and for the conducting wire on the terminating end side are configured to be separately provided in two positions apart in a circumferential direction of the coil component 1, although the shape of the base part 9 is liable to be further complicated, the longitudinal groove parts can be obviously separately provided in such a manner.

In addition, the coil component in the embodiment described above is specified to be used for an on-vehicle solenoid valve, but the coil component of the present invention is not limited thereto, and can be used as various coil components used for performing operation or control of general machinery and mechanisms, including machinery and mechanisms for performing switching operation of various members to be mounted in an automobile.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coil component, comprising a terminal electrode having a wire connection part to be connected to a conducting wire, and a wiring part formed by winding the conducting wire from the terminal electrode therearound, wherein the coil component further includes
    a locking part to which an end part of the conducting wire is locked, and
    a structure for supporting the conducting wire,
    wherein a path for the conducting wire extends in order from the locking part, to the wire connection part, to the structure for supporting the conducting wire, and to the wiring part, and
    wherein a distance between the wiring part and the structure for supporting the conducting wire is longer than a distance between the wiring part and the wire connection part, and a distance between the wiring part and the locking part.

2. The coil component according to claim 1, wherein the structure for supporting the conducting wire is a wire support part which is projected from a side part of the terminal electrode toward a lateral direction.

3. The coil component according to claim 2, wherein the terminal electrode comprises a wide part formed to be wide in a lengthwise direction of the wire support part on a side reverse to the wire connection part with interposing the wire support part therebetween,
    a notch is formed from a lateral direction of the terminal electrode on a side of the wire support part in the wide part, and the notch and a tip part of the wire support part on the lateral side are combined, and a V-shaped notch part is formed, and
    the conducting wire is configured in a manner of being fitted into the V-shaped notch part in a state in which the conducting wire is wound around about one half a circumferential surface of the wire support part.

4. The coil component according to claim 2, wherein the wire connection part is arranged in a position deviated from a place on a straight line with which a conducting wire locking portion of the locking part, and a conducting wire wiring portion of the wire support part are connected, and the conducting wire which is run among members of the conducting wire locking portion of the locking part, the conducting wire wiring portion of the wire support part, and the wire connection part is tightly stretched in a meandering manner among the members.

5. The coil component according to claim 1, wherein
    a base part made of resin is provided on a side of the terminal electrode reverse to the wiring part, and
    a guide part for guiding the conducting wire from the terminal electrode to the wiring part in diverting the terminal electrode is formed in the base part made of resin, wherein
    the guide part comprises at least a side surface guide member and a bottom surface guide member for guiding the conducting wire along a surface in a lateral direction of the coil component, and a longitudinal groove guide member which is formed in a position closer to the wiring part than the side surface guide member and the bottom surface guide member to guide the conducting wire in a longitudinal direction of the coil component.

6. The coil component according to claim 5, wherein a top surface of the wire support part of the terminal electrode, and a bottom surface of the bottom surface guide member are formed to be flush with each other.

7. The coil component according to claim 5, wherein
    the longitudinal groove guide member is provided with a lead groove into which at least one of the conducting wires on a starting end side and on a terminating end side is fitted and the conducting wire is guided, and
    a pedestal-shaped part in which the other of the conducting wires on the starting end side and on the terminating end side is guided in a manner of being in parallel with the lead groove in a position higher than the lead groove by one step.

8. The coil component according to claim 7, wherein an eaves part for preventing departure of the other conducting wire from the longitudinal groove guide member is provided in a position facing the pedestal-shaped part with interposing the conducting wire therebetween.

9. The coil component according to claim 5, wherein the coil component comprises, on the base part made of resin, a rib part of the terminal electrode, in which a fitting hole for fitting a leg part of a conductive connection piece formed into an elongated plate shape is arranged, and the rib part is formed into a height allowing formation of a deep fitting hole at a degree of being able to suppress the conductive connection piece from inclining even if deformation of the leg part of the conductive connection piece is caused.

10. The coil component according to claim 5, wherein the base part made of resin is formed of a plastic resin, integrally with a bobbin around which the conducting wire is wound in the wiring part.

11. The coil component according to claim 1, wherein the wire connection part is formed into a J-shaped belt form in cross section according to which the conducting wire is included therein over a predetermined length.

12. The coil component according to claim 1, wherein the coil component is coated with an overmolded exterior part with a resin agent.

13. A method for producing a coil component comprising a terminal electrode having a wire connection part to be connected to a conducting wire, and a wiring part formed by winding the conducting wire from the terminal electrode therearound, wherein the method comprises:
    locking a starting end part of the conducting wire to a locking part provided thereon on a side of the wiring part for the wire connection part in the terminal electrode, and
    providing a structure for supporting the conducting wire, wherein a path for the conducting wire extends in order from the locking part, to the wire connection part, to the structure for supporting the conducting wire, and to the wiring part, and
    wherein a distance between the wiring part and the structure for supporting the conducting wire is longer than a distance between the wiring part and the wire connection part, and a distance between the wiring part and the locking part.

14. The method for producing the coil component according to claim 13, wherein the wire connection part is subjected to processing of caulking and resistance welding in a state in which the conducting wire is included therein.

* * * * *